United States Patent [19]

Heitmann

[11] 4,161,623
[45] Jul. 17, 1979

[54] CODE GENERATOR FOR TEXT TRANSMISSION DEVICES

[75] Inventor: Jüergen Heitmann, Munich, Fed. Rep. of Germany

[73] Assignee: Siemens Aktiengesellschaft, Berlin & Munich, Fed. Rep. of Germany

[21] Appl. No.: 879,639

[22] Filed: Feb. 21, 1978

[30] Foreign Application Priority Data

Feb. 25, 1977 [DE] Fed. Rep. of Germany ....... 2708333

[51] Int. Cl.² .............................................. H04L 15/00
[52] U.S. Cl. ...................................... 178/79; 178/2 R; 178/17.5
[58] Field of Search ...................... 178/4.1 R, 79, 2 R, 178/3, 17.5; 179/2 A, 6 E

[56] References Cited

U.S. PATENT DOCUMENTS

| | | | |
|---|---|---|---|
| 3,511,923 | 5/1970 | Ameau et al. | 178/4.1 R |
| 3,909,510 | 9/1975 | Luce | 178/4.1 R |
| 3,968,330 | 7/1976 | Ludwig | 178/79 |
| 4,006,316 | 2/1977 | Bolgiano | 179/2 A |

Primary Examiner—Thomas A. Robinson
Attorney, Agent, or Firm—Hill, Van Santen, Steadman, Chiara & Simpson

[57] ABSTRACT

A code generator for text transmission devices emits code characters assigned to subscribers over a trunk line in order to allow a subscriber to be recognized. The code characters are stored in a memory which is formed from electronically operable storage elements and remain unchanged following disconnection of the operating voltage. A write-in control unit is provided for writing the code characters into the memory and a read-out control unit is provided for reading the code characters from the memory. The write-in control unit can be connected by way of a line matching unit to the trunk line by way of which the texts are normally transmitted, and the code characters can be input into the memory from a central position by way of the trunk line.

6 Claims, 2 Drawing Figures

CODE GENERATOR FOR TEXT TRANSMISSION DEVICES

BACKGROUND OF THE INVENTION

1. Field of the Invention

The present invention relates to a code generator for text transmission devices which, in order to permit a subscriber to be recognized, emits the code characters assigned to the subscriber over a trunk line, wherein the code characters are stored in a memory which is formed from electronically operable storage elements whose information content remains unchanged upon disconnection of the operating voltage, and more particularly to a code generator in which a write-in control unit is provided by means of which the code characters are written into the memory, and wherein a read-out control unit is provided by means of which the code characters are read from the memory.

2. Description of the Prior Art

Text transmission devices are normally provided with code generators. The code generator of a first subscriber is interrogated following the establishment of a connection between the first subscriber and a second subscriber. The code generator emits a sequence of code characters which is assigned to the first subscriber and with the aid of which the second subscriber ca determine whether a correct connection has been established. It is also possible for the code generator to be triggered by the relevant subscriber.

It is already generally well known in the art to employ mechanical code generators in teleprinters. With this type of code generator, the characters are stored in combs arranged radially on a roller. The number of combs is equal to the number of characters to be emitted by the code generator. Each comb is provided with teeth, the number of which corresponds to the number of elements of a code character. Each tooth is assigned to one information element of the code character with start element polarity, and for each information element of the code character with stop element polarity one tooth must be broken from the comb. The characters are interrogated in that the roller is moved and contacts are opened or closed depending upon the presence or absence of the teeth. This known code generator has the disadvantage that a change of the characters necessitates mechanical intervention. Furthermore, due to the need to employ a transport magnet, it has a large power consumption. The contacts require interference suppression elements in order to ensure satisfactory cooperation with the electrical units of the teleprinter. In order to return the code generator to its basic position, elaborate procedures are required if, for example, during the transmission of the characters, the connection to the second subscriber is broken or the main power supply fails. Furthermore, the known code generator has the disadvantage that it contains moving mechanical components which are subject to wear and which give rise to noise.

U.S. Pat. No. 3,968,330, issued to Martin Ludwig on July 6, 1976 and assigned to the same assignee as the present invention, discloses a code generator which contains a memory which is constructed from electronically operable storage elements and which stores the code characters, and wherein the characters are not changed following the disconnection of the operating voltage. Memories of this kind are also referred to as electronically alterable fixed word memories. In this known code generator, the code characters are written into the memory wth the aid of a write-in control unit arranged on a plug-in assembly. The write-in control unit is plugged in only when required during installation, in order to input the code characters, for example by a service technician. The code characters are input with the aid of a keyboard or a punched tape read-out device which forms a part of the relevant device. If the memory consists of an unalterable fixed word memory, write-in into the memory is effected, for example, by the manufacturer and to enable it to be exchange, if required, it is arranged as a plug-in device.

If the write-in into the code generator is effected on the device itself, or the memory is exchangeable, the danger of adulteration by the user exists, if the user should come into possession of the write-in control unit or a modified memory module. Furthermore, this code generator has the disadvantage that the construction of the devices requires that particularly skilled personnel be entrusted with the modification of the code characters.

SUMMARY OF THE INVENTION

The object of the invention is to provide a code generator for text transmission devices which is inaccessible to the user of the device and wherein the danger of adulteration is substantially reduced.

According to the invention, the above object is achieved in a code generator of the type generally described above in that the write-in control unit can be connected by way of a connection unit to a trunk line via which texts are transmitted normally, and that the code characters can be input into the memory from a central position by way of the trunk line.

The code generator constructed in accordance with the present invention has the advantage that the construction of the text transmission device, for example in an office, is substantially simplified as it is only necessary to connect the trunk line during the installation. Neither skilled personnel nor special write-in control units which must be carried by the service technician are required. The write-in into the code generator is carried out centrally, and possibly under computer control, from an exchange. Modification of the code characters is carried over the trunk line and when fixed word memories formed from electronically operable storage elements are required, no storage modules become unserviceable.

In order to release the write-in control unit for the input of the code characters, it is advantageous to provide a decoder which, upon recognition of a predetermined control character transmitted over the trunk line, feeds the write-in control unit with a release signal which releases the input of code characters subsequently transmitted over the trunk line into the memory.

In order to prevent a write-in of code characters by means of a further text transmission device, it is advantageous for the control characters to consist of characters which cannot be produced by the text transmission device itself.

In order to permit the release signal to be produced at the text transmission device itself, it is advantageous to provide a code switch which feeds the write-in control unit with a release signal which releases the input of the code characters transmitted over the trunk line into the memory.

The code generator requires a low outlay if the memory forms part of a working memory contained in the text transmission device.

In order to prevent the memory being erroneously overwritten by transmitted data or data to be transmitted, it is advantageous to assign the memory to a protected zone of the working memory into which characters can be input only following occurrence of a release signal.

BRIEF DESCRIPTION OF THE DRAWING

Other objects, features and advantages of the invention, its organization, construction and operation will be best understood from the detailed description, taken in conjunction with the accompanying drawing, on which.

DESCRIPTION OF THE PREFERRED EMBODIMENT

Figure 1:
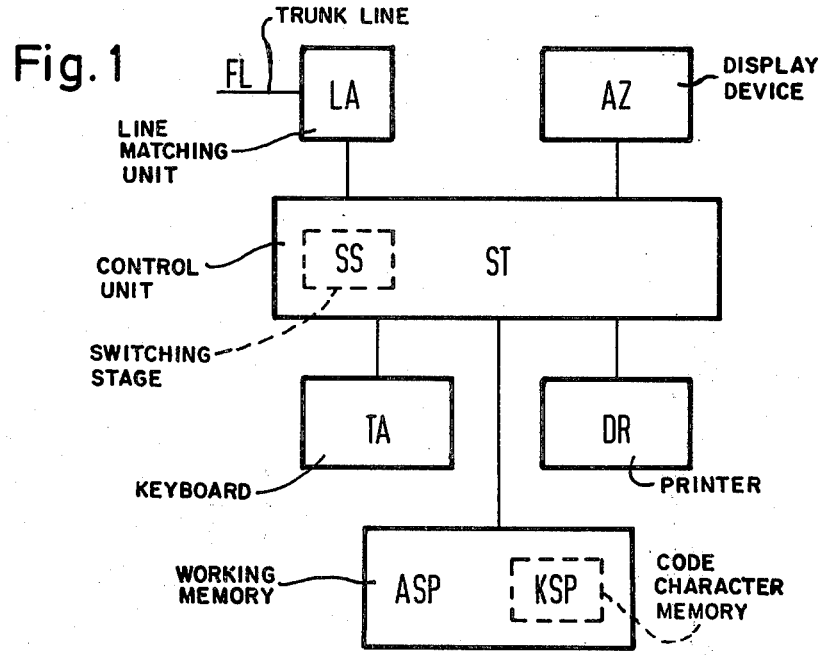
FIG. 1 is a block circuit diagram of a text transmission device.

A text transmission device is illustrated in FIG. 1 as comprising a control unit ST, an input device designed as a keyboard TA, an output device designed as a printer DR or as a display device AZ, for example as a data viewing device, a working memory ASP and a line matching unit LA with which the text transmission device is matched to a trunk line FL. The control unit ST contains a plurality of switching elements would serve to control the cooperation between the keyboard TA, the printer DR, the display unit AZ, the working memory ASP and the line matching unit LA.

A text input by means of the keyboard TA is indicated, for example, by the text transmission device to the display unit AZ. At the same time the text is stored in the working memory ASP. Following any change in the text, the latter can be output on the printer DR or transmitted via the line matching unit LA to a remote subscriber. A text can also be transmitted from the remote subscriber by way of the trunk line FL to the text transmission device. The received test is displayed, for example on the display unit AZ, stored in the working memory ASP, or output on the printer DR.

In the transmission of text it is normal to exchange code characters following the establishment of a connection between the subscribers, in order to check the desired connection, particularly in the case of an unattended receiving station. The code characters are also used in order to identify subscribers and/or to levy charges. Furthermore, an exchange of the code characters at the end of a text transmission can be employed as an acknowledgment of the reception of the text. Therefore, the text transmission device is provided with a code generator in which code characters assigned to the relevant subscriber are stored. These code characters are established by the relevant postal administration, for example, and set up in the text transmission device. The code characters are stored in the text transmission device in a memory KSP which can be part of the working memory ASP. Following the establishment of a connection, the code characters are read out from the memory KSP and transmitted by way of the trunk line FL to the remote subscriber.

As the code characters are used for the identification of the subscriber and, in part, also for charging purposes, the code characters must not be permitted to be adulterated. Furthermore, the code characters must be stored in such a manner that they are not changed upon disconnection of the operating voltage of the text transmission device. Therefore, electrically modifiable fixed word memories which are constructed, for example, from MNOS (metal-nitride-oxide-substrate) transistors are particularly suitable as storage elements of the memory KSP. A fixed word memory of this type is described, for example, in the aforementioned U.S. Pat. No. 3,968,330.

In order to achieve the greatest possible safeguard against adulteration, in the text transmission device, write-in into the memory KSP is effected, not in the device itself, but via the trunk line FL from an exchange. Therefore, the control unit ST contains a switching stage SS which, following the reception of at least one corresponding, coded control character which, for example, cannot be produced by the text transmission devices, or following the actuation of a code switch arranged in the text transmission device, produces a release signal with which characters subsequently transmitted over the trunk line FL are input as code characters into the memory KSP. This procedure is normally carried out only following the installation of text transmission device.

Figure 2:
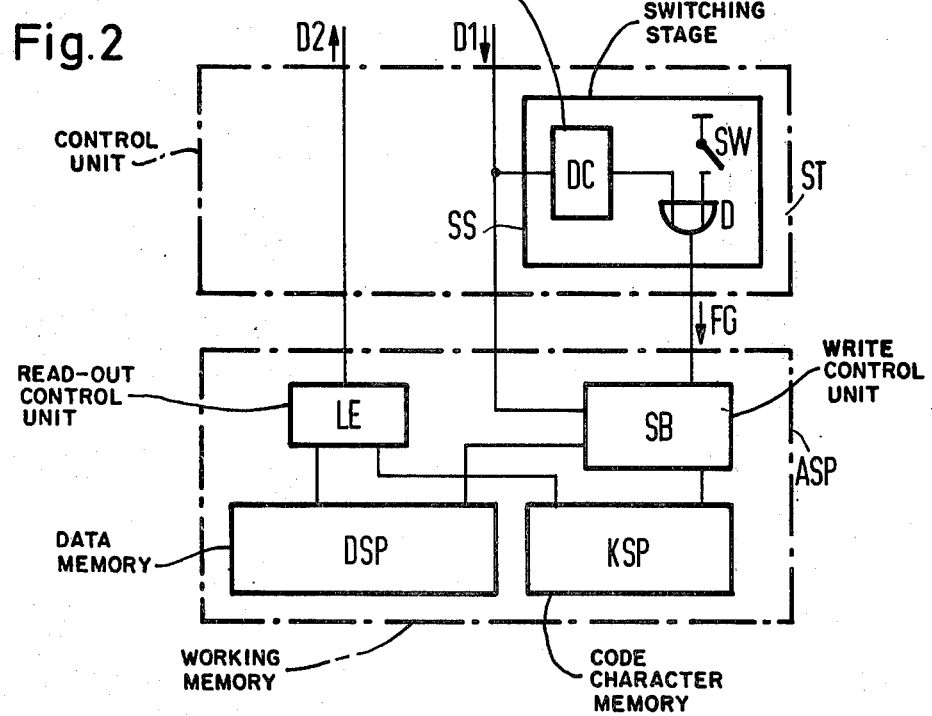
FIG. 2 is a block circuit diagram of portions of a control unit and of a working memory in the text transmission device.

The switching stage SS which is illustrated in FIG. 2 and which is contained in the control unit ST comprises a decoder DC, an OR gate D and a code switch SW. The decoder DC is supplied with data signals D1 which are transmitted from the trunk line FL by way of the line matching unit LA to the control unit ST and are assigned to received data. If the received data are stored, the data signals D1 are also supplied to the working memory ASP. The working memory ASP contains a write-in control unit SB which inputs the data into a data memory DSP. If the data signals D1 represent code characters, these code characters are input into the memory KSP by means of the write-in control unit SB. However, the input of code characters into the code memory KSP is carried out only when a release signal FG is emitted from the switching stage SS to the write-in control unit SB. This release signal can, for example, release in the write-in control unit SB, an AND gate from whose output the code characters are emitted only when the release signal FG is present.

In order to ensure that other items of data are not incorrectly input into the memory KSP as code characters, the release signal FG is, for example, produced only when one or a plurality of predetermined control characters are transmitted over the trunk line FL or when a code switch is actuated in the text transmission device.

When the control characters are transmitted over the trunk lines, they are recognized by the decoder DC and the decoder DC emits the release signal FG from its output by way of an OR gate D to the write-in control unit SB. The decoder DC can be designed in such a manner that it compares one or more control characters with predetermined theoretical control characters and in the event of identity emit a signal. It can also contain a flip-flop which is set on the occurrence of the control characters and which remains set until, following the transmission of the code characters, further control characters are transmitted which reset the flip-flop. Then, a signal assigned to the release signal FG is emitted at the output of the flip-flop. The decoder DC can also contain a counter which is released following the occurrence of the control characters prior to the code characters and which terminates the release signal FG when it has counted off as many code characters as are to be input into the memory KSP.

Following the actuation of the code switch in the text transmission device, the switch SW in the switching stage SS is closed and a release signal FG can likewise be emitted via the OR gate D. The code switch is actuated following the installation of the text transmission device by the service technician. Then, following the occurrence of the release signal FG, the code characters are transmitted from the exchange to the text transmission device and input into the memory KSP by means of the write-in control unit SB. Following the write-in, the code in the code switch is removed and the switch SW is opened. In this manner, it is impossible for any further data to be input into the memory KSP.

In order to read out the code characters from the memory KSP following the establishment of a connection, the working memory ASP contains a read-out control unit LE, from the output of which data signals D2, representing the code characters, are emitted by way of the control unit ST to the line matching unit LA. The read-out control unit LE can also be used to read out a text stored in the data memory DSP. This text is then likewise transmitted in the form of data signals D2 to the line matching unit LA, and from the line matching unit LA over the trunk line FL.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a code generator for text transmission devices of the type which, in order to allow a subscriber to be recognized, emits code characters assigned to the subscriber over a trunk line, the code characters being stored in a memory which comprises electrically operable storage elements whose content remains unchanged upon a loss of operating voltage, a write-in control unit being connected to the memory for writing-in code characters, and a read-out control unit being connected to the memory for reading the code characters, the improvement therein comprising:
  a line matching unit connecting the write-in control unit to the trunk line for inputting code characters from a central position to the memory via the trunk line over which normal text transmission occurs.

2. The improved code generator of claim 1, and further defined as comprising:
  a decoder connected to said line matching unit and to said write-in control unit and operable in response to receipt of a predetermined control character to provide a release signal to said write-in control unit to release the input of subsequently transmitted code characters into said memory.

3. The improved code generator of claim 2, wherein characters which cannot be produced by the text transmission device are used as said control characters.

4. The improved code generator of claim 1, and further defined as comprising:
  a code switch connected to said write-in control circuit and operable to produce a release signal to release the input of code characters from the trunk line to the memory.

5. The improved code generator of claim 4, wherein said memory is assigned to a protected zone of said working memory and is operable to store code characters only upon receipt of said release signal.

6. The improved code generator of claim 1, comprising a working memory in said text transmission device which includes said code character storage memory.

* * * * *